(12) United States Patent
Smith et al.

(10) Patent No.: US 11,784,428 B2
(45) Date of Patent: Oct. 10, 2023

(54) STRUCTURAL FASTENER

(71) Applicant: Mag Daddy LLC, Cary, IL (US)

(72) Inventors: Michael Walter Smith, Palatine, IL (US); Daniel James Dickinson, Lincolnshire, IL (US); Zach Reusch, Lake Zurich, IL (US); John Heinzinger, Indian Creek, IL (US)

(73) Assignee: MAG DADDY LLC, Wauconda, IL (US)

( * ) Notice: Subject to any disclaimer, the term of this patent is extended or adjusted under 35 U.S.C. 154(b) by 98 days.

(21) Appl. No.: 16/597,060

(22) Filed: Oct. 9, 2019

(65) Prior Publication Data

US 2020/0091643 A1    Mar. 19, 2020

Related U.S. Application Data

(63) Continuation-in-part of application No. 15/998,605, filed on Aug. 20, 2018, now Pat. No. 11,261,897.

(60) Provisional application No. 62/751,732, filed on Oct. 29, 2018.

(51) Int. Cl.
| | |
|---|---|
| *F16L 3/24* | (2006.01) |
| *H01R 13/115* | (2006.01) |
| *H01R 13/629* | (2006.01) |
| *H01R 43/26* | (2006.01) |
| *H01R 24/76* | (2011.01) |
| *F16B 7/04* | (2006.01) |
| *F16L 3/227* | (2006.01) |

(52) U.S. Cl.
CPC .......... *H01R 13/115* (2013.01); *F16B 7/0493* (2013.01); *F16L 3/227* (2013.01); *F16L 3/243* (2019.08); *H01R 13/629* (2013.01); *H01R 24/76* (2013.01); *H01R 43/26* (2013.01)

(58) Field of Classification Search
CPC ... F16L 3/227; F16L 3/24; F16L 3/243; F16B 37/043; F16B 7/0473; F16B 37/045; F16B 7/187; F24S 2025/804
See application file for complete search history.

(56) References Cited

U.S. PATENT DOCUMENTS

| | | | | |
|---|---|---|---|---|
| 2,918,240 A | * | 12/1959 | Wiegand | F16L 3/227 248/71 |
| 3,346,863 A | * | 10/1967 | Siebold | H01Q 7/00 343/702 |
| 3,532,311 A | * | 10/1970 | Havener | F16L 3/227 248/62 |
| 4,783,040 A | * | 11/1988 | Lindberg | F16L 3/243 248/74.3 |

(Continued)

*Primary Examiner* — Bradley Duckworth

(57) ABSTRACT

A U-shaped band to attach or snap a conduit or pipe to a slotted structural member. The U-shaped band includes a bottom portion, a first side having a first arm connected to the bottom portion; a second side having a second arm connected to the bottom portion thereby forming a U-shaped structure with the first and second sides. The at least one arm snaps into a slot of the slotted structural member when in an engaged position. The slotted structural member may be a strut or a receiver. The receiver has arms to engage and snap into curled ends or lips on sides of the strut and thus may adapt the band to the strut. Alternatively, the band may snap into suitably sized slots on the slotted structural member.

19 Claims, 23 Drawing Sheets

(56) References Cited

U.S. PATENT DOCUMENTS

| | | | | |
|---|---|---|---|---|
| 5,149,026 A * | 9/1992 | Allen | | F16L 3/227 248/68.1 |
| 5,919,019 A * | 7/1999 | Fischer | | F16B 37/043 411/182 |
| 6,257,530 B1 * | 7/2001 | Tsai | | F16L 3/127 248/73 |
| 6,354,543 B1 * | 3/2002 | Paske | | H01P 1/00 248/68.1 |
| 6,976,292 B2 * | 12/2005 | MacPherson | | B60N 3/026 24/292 |
| 7,090,174 B2 * | 8/2006 | Korczak | | F16B 37/045 248/61 |
| 7,226,260 B2 * | 6/2007 | Jackson, Jr. | | F16B 21/076 411/112 |
| 8,439,316 B2 * | 5/2013 | Feige | | F16L 3/10 248/71 |
| 8,590,223 B2 * | 11/2013 | Kilgore | | H02S 20/24 52/173.3 |
| 8,714,495 B2 * | 5/2014 | Myers | | F16L 3/1211 248/74.1 |
| 8,800,120 B2 * | 8/2014 | Benedetti | | F16B 5/0642 24/458 |
| 8,844,888 B1 * | 9/2014 | Gretz | | F16L 3/2431 248/231.81 |
| 9,331,629 B2 * | 5/2016 | Cheung | | H02S 20/23 |
| 9,562,554 B2 * | 2/2017 | Vidal | | F16B 37/02 |
| 9,574,589 B2 * | 2/2017 | Knutson | | F16L 3/243 |
| 9,879,803 B2 * | 1/2018 | Leng | | H02G 3/32 |
| 2002/0100146 A1 * | 8/2002 | Ko | | F16B 37/02 24/295 |
| 2005/0236861 A1 * | 10/2005 | Slobodecki | | F16B 37/043 296/39.1 |
| 2011/0084179 A1 * | 4/2011 | Wiedner | | F16L 3/12 248/67.7 |
| 2011/0163562 A1 * | 7/2011 | Smith | | F16B 37/0842 296/1.07 |
| 2018/0245716 A1 * | 8/2018 | Nijdam | | H02G 3/0456 |
| 2018/0335072 A1 * | 11/2018 | Wilson | | F16B 37/043 |
| 2018/0347614 A1 * | 12/2018 | Reznar | | F16B 37/046 |
| 2020/0347962 A1 * | 11/2020 | Smith | | F16L 3/227 |

\* cited by examiner

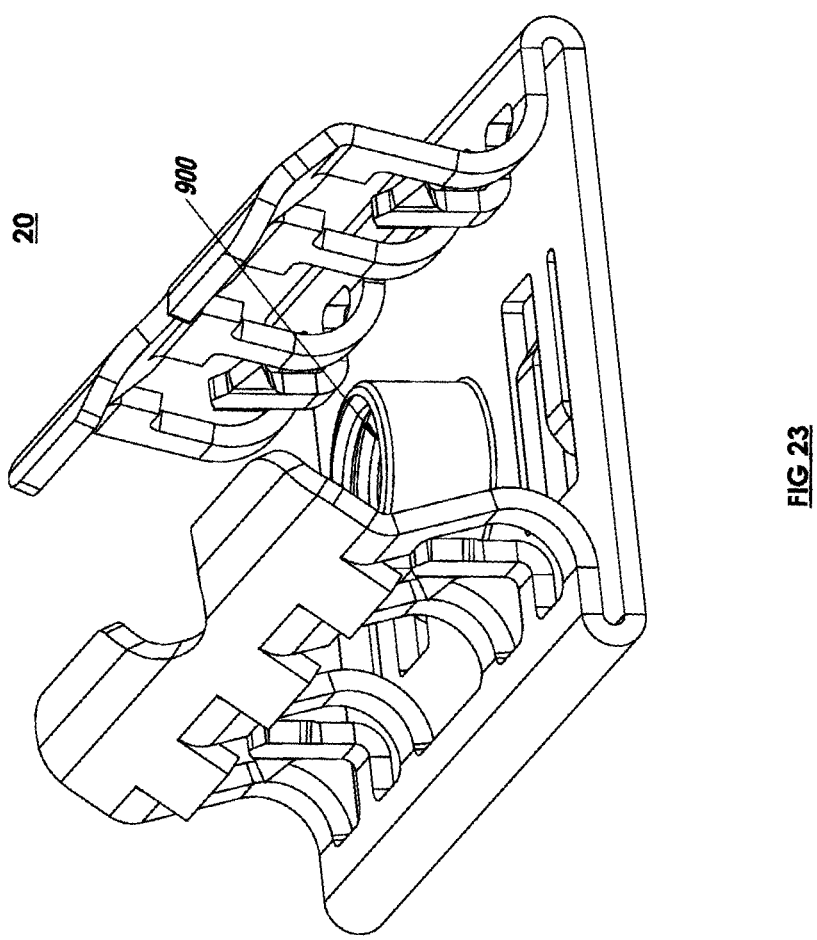

STRUCTURAL FASTENER

RELATED APPLICATIONS

This application is a continuation in part application of U.S. patent application Ser. No. 15/998,605 entitled "Structural Fastener" filed on Aug. 20, 2018, which is a continuation in part application of U.S. patent application Ser. No. 14/147,522 entitled "Spring fastener" filed on Jan. 4, 2014, which is a continuation in part application of U.S. patent application Ser. No. 13/476,957 entitled "Spring fastener with highly improved lever/angle pulling force" filed on May 21, 2012, which is a continuation in part of U.S. patent application Ser. No. 11/564,840 entitled "Spring fastener with highly improved lever/angle pulling force" filed on Nov. 29, 2006, which is a continuation in part of U.S. Pat. No. 7,188,392 entitled "Spring fastener with highly improved lever/angle pulling force", filed on Sep. 16, 2004, which claims priority from provisional application 60/520,807 filed on Nov. 17, 2003 and owned by the instant assignee.

FIELD OF THE INVENTION

The invention relates generally to devices for fastening objects, and more particularly to a fastener and strut hangers to secure construction components or to attach onto an engagement structure, such as a chassis, a strut, a hollow substrate, a wall, a plate or any suitable surface.

BACKGROUND OF THE INVENTION

A number of devices and fasteners are currently available to secure cables or for fastening pipes, conduit and cables to a building structure. Similarly, threaded rods, struts, panels, body panels, building structure, and electrical conduit are fastened to the chassis or frame of a building. For example, spring nuts and other devices are used to secure bolts and threaded rods to a strut or truss. Clamps and cable ties are used to secure cables in electrical wiring and boxes. As used herein, a strut refers to a u-shaped bracket having holes to allow for attachment at various points and to facilitate a variety of construction situations. The chassis of the building may include any substrate, plate, roof or ceiling support, structural framework, chassis component or subcomponent, support component, wall or any suitable object or combination.

Attaching wires or cables to a building structure, electrical box or body panel typically requires conventional securing threaded rods, bolts, wires, cable clamps, electrical boxes, screw in cable clamps, straps, tape or clips already fastened to a wire assembly. These conventional devices require two hands to manipulate and install and require time to screw a bolt or nut. If the installed device is not in the desired position or level, then the installer must loosen the screw or bolt and then re-align the device and retighten, thus extending the installation time even further. At least some of the conventional fasteners require extended height or blind insertion and installation of the fasteners because the installer is not able to view the fastener or the mounting point on the body panel. These conventional fasteners require fastening with a screwdriver or wrench and thus are cumbersome and difficult to install, especially in inaccessible areas. Nor can they be installed without a screwdriver or wrench for example on an electrical box, conduit or in automobile environments that can be somewhat harsh. Further, replacement of an installed, broken nut, rod or strut requires removal and can again be difficult.

BRIEF DESCRIPTION OF THE DRAWINGS

FIG. 22-23 illustrate one embodiment wherein the bottom portion 630 has threads

DETAILED DESCRIPTION OF THE PREFERRED EMBODIMENTS

Figure 1:
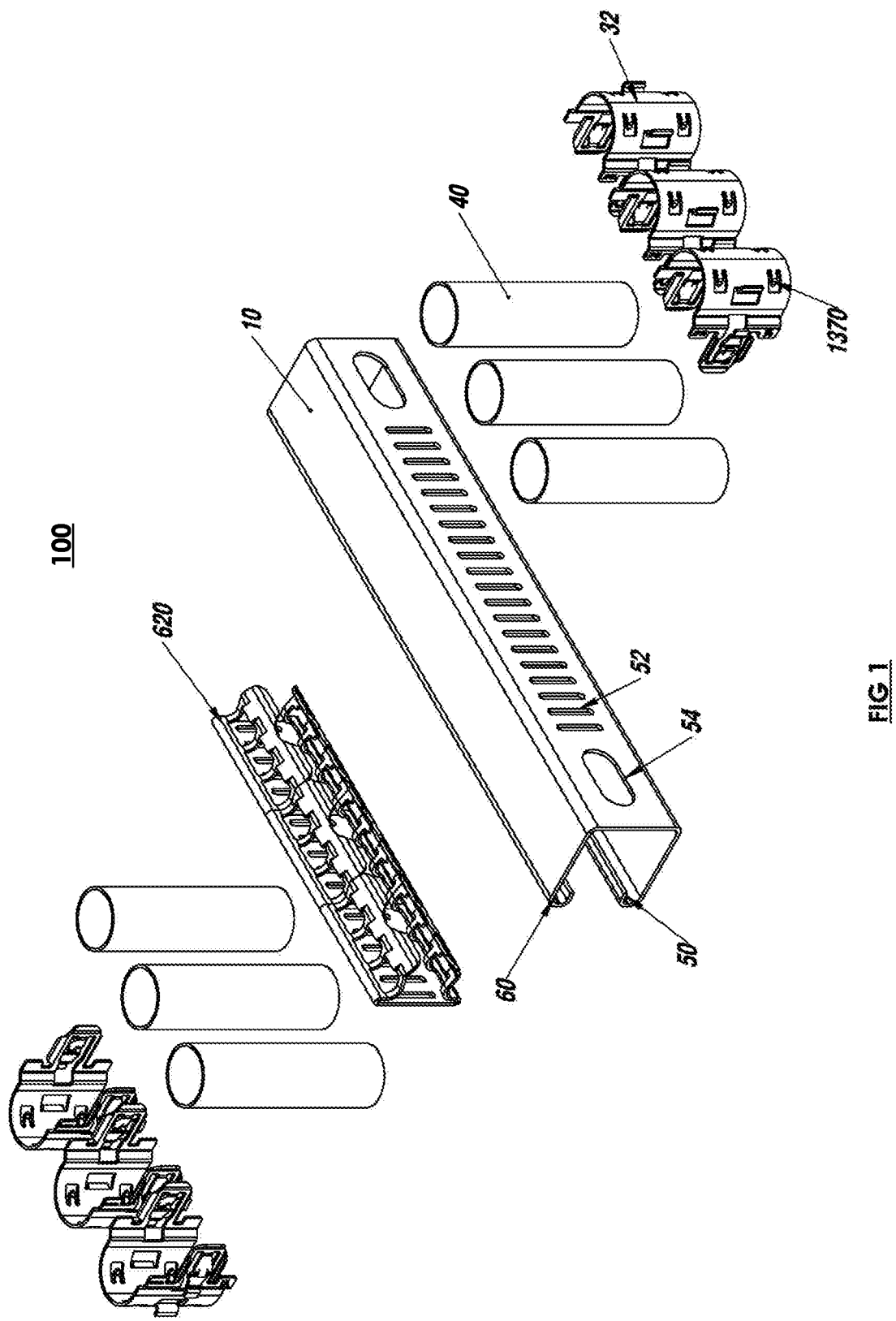
FIG. 1 is an exploded view of a slotted structural member assembly with multiple cages and a strut member operable to attach to a conduit or pipe according to one embodiment.

A U-shaped band to attach or snap a conduit or pipe to a slotted structural member. The U-shaped band includes a bottom portion, a first side having a first arm connected to the bottom portion; a second side having a second arm connected to the bottom portion thereby forming a U-shaped structure with the first and second sides. The at least one arm snaps into a slot of the slotted structural member when in an engaged position. The slotted structural member may be a strut or a receiver. The receiver has arms to engage and snap into curled ends or lips on sides of the strut and thus may adapt the band to the strut. Alternatively, the band may snap into suitably sized slots on the slotted structural member.

According to one embodiment, one or both arms of the band may snap into slot in either the strut or the receiver.

According to one embodiment, wings on each of the ends of the cage engage corresponding slots on the receiver to stabilize and retain the cage on the receiver. The strut receiver has an engagement region on the wings. The engagement regions may engage an edge of a channel rib.

The receiver and the cage are comprised of at least one of: zinc die cast, machine steel, cast plastic or powdered metal, cindered (pressing powder together), plastic, vinyl, rubber, plastisol, plastic, acetal, polyacetal, polyoxymethylene, nylon, fiberglass and carbon fiber.

During installation, the receiver may be easily snapped into the strut and the band may be easily and quickly snapped into the receiver thus quickly attaching the pipe to the strut. This reduces the amount of time to attach pipes, conduit electrical wires or any suitable construction materials to a building structure.

The band and receiver permits relatively easy insertion of the strut into a building chassis, pillar, structure, door, roof or suitable panel while providing a relatively high level of strength and support. Assembly of the band onto the receiver is very easy and requires no or a relatively low level of installation effort and as a result provides many ergonomic advantages. The receiver and band eliminates the need for threading a clamp or nut on a long threaded rod, and thus significantly reduces the clamp nut-threaded rod assembly. Also, the installer can snap the receiver and band with one hand whereas the prior art conventional nuts require two hands to hold the clamp or nut and the structural construction member.

The relatively easy attachment is particularly advantageous for operators who repetitively install pipes, conduit electrical wires or any suitable construction materials onto the building chassis. The relatively easy installation required for inserting the receiver and band into the building chassis may result in fewer injuries to the assembly workers, including injuries related to repetitive stress syndrome. Further by selecting a receiver and band or reducing the number of different receiver and band for different strut lengths and thicknesses, confusion during assembly is eliminated since the same type or a reduced number of fasteners may be used for all or most struts. Thus, an electrician, installer, or assembly worker need not worry about selecting the wrong fastener.

The relatively high level of strength, characteristic of the receiver and band, securely attaches to the building or chassis. Further, the receiver and band quickly and easily adjusts to the structural member and minimizes long tedious threading of nuts and clamps, flexing of the fastener and structural members, pushing by operators, vibration and thermal expansion. For example, since conventional top and bottom nuts between the strut are required to clamp the strut, changes in length of the strut or rod requires untightening and tightening of the nuts. In contrast, the receiver is removed from the strut slot may be easily inserted into the desired position on the structural member. The receiver and band may also fasten to plastic and/or metal engagement structures. The receiver and band nut may be made of anti-corrosive material such as plastic or treated metal to provide long reliable service life.

Yet another advantage is that the receiver and band is relatively easy to manufacture using relatively inexpensive manufacturing processes and materials. The use of the receiver and band decreases installation effort and time, assembly and production costs, increases worker productivity and efficiency, improves reliability and quality and decreases overall assembly, warranty and maintenance costs. The receiver and band improves reliability both in the short term and in the long term, while further improving safety and quality.

FIGS. 1-6 are exploded views of a strut receiver assembly 100, 200, 400 providing springing attachment to a slotted structural member 10 such as a structural member commonly known as a "strut." Strut receiver assembly 100 includes a strut receiver 620, and a band or cage 32 operable to detachably couple a pipe 40.

FIGS. 1-5 are examples of 1, 2, 3, 4 or more bands or cages 32 snapping into one or more struts 10 or receiver 20. FIGS. 2-6 show a strut receiver 20 in an engaged position with a band or cage 32 and strut member 10 operable to attach to a pipe 40 according to another embodiment. The strut receiver 20 is in an engaged position with multiple bands or cages 32 and a strut member 10 operable to attach to multiple pipes 40 according to another embodiment. Multiple bands or cages 32 are shown snapped to the strut receiver 20 in an engaged position with a strut member 10 operable to attach to multiple pipes 40 according to another embodiment. Bands or cages 32 and receivers 20 may span multiple struts 10 and conversely multiple struts 10 may span a receiver 20 and thus the cages 32 and receivers 20 are extremely flexible building blocks capable of supporting multiple pipes.

Figure 15:
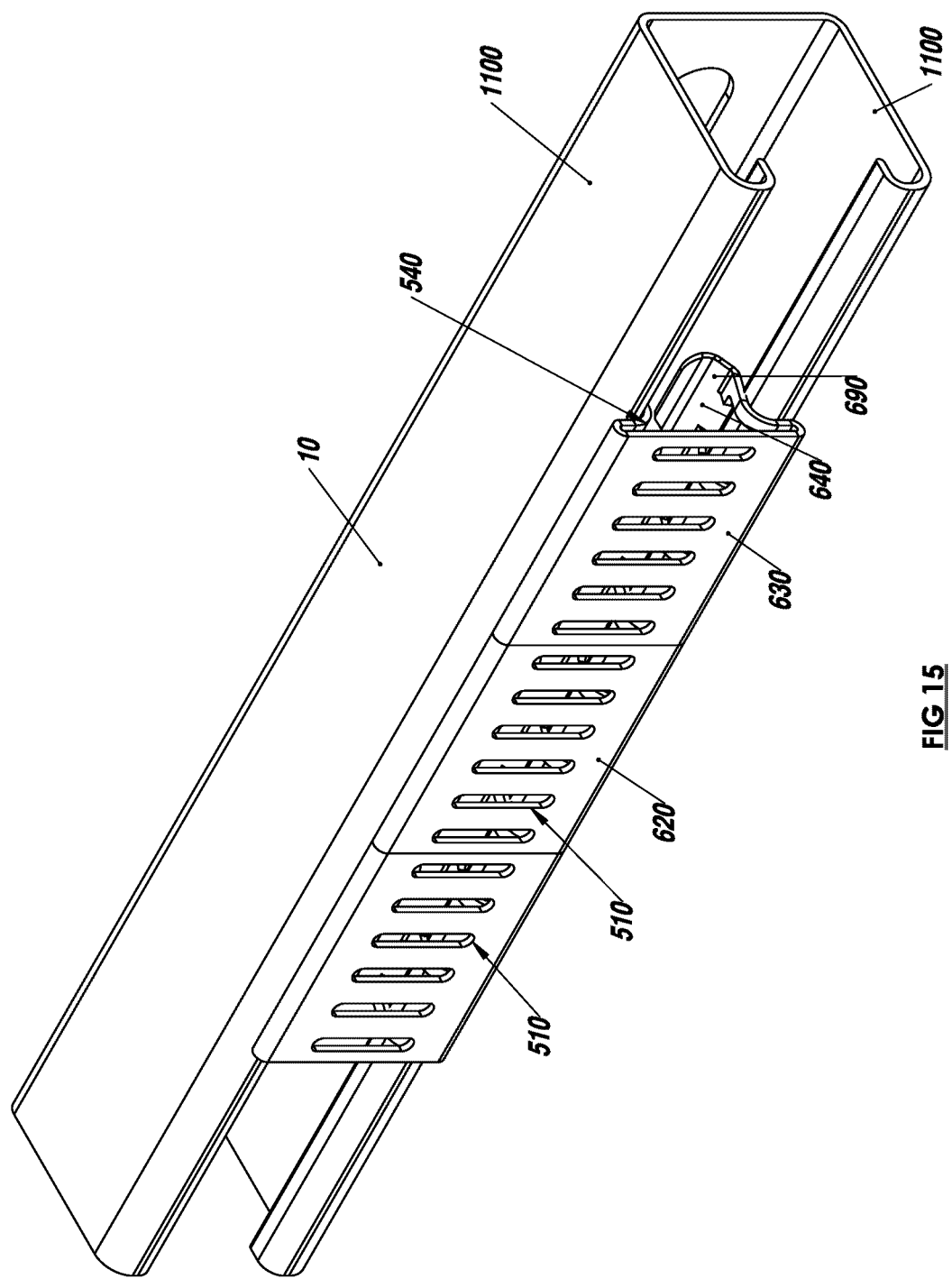
FIG. 15 is a perspective view of multiple strut receivers in an engaged position with a strut member.
Figure 16:
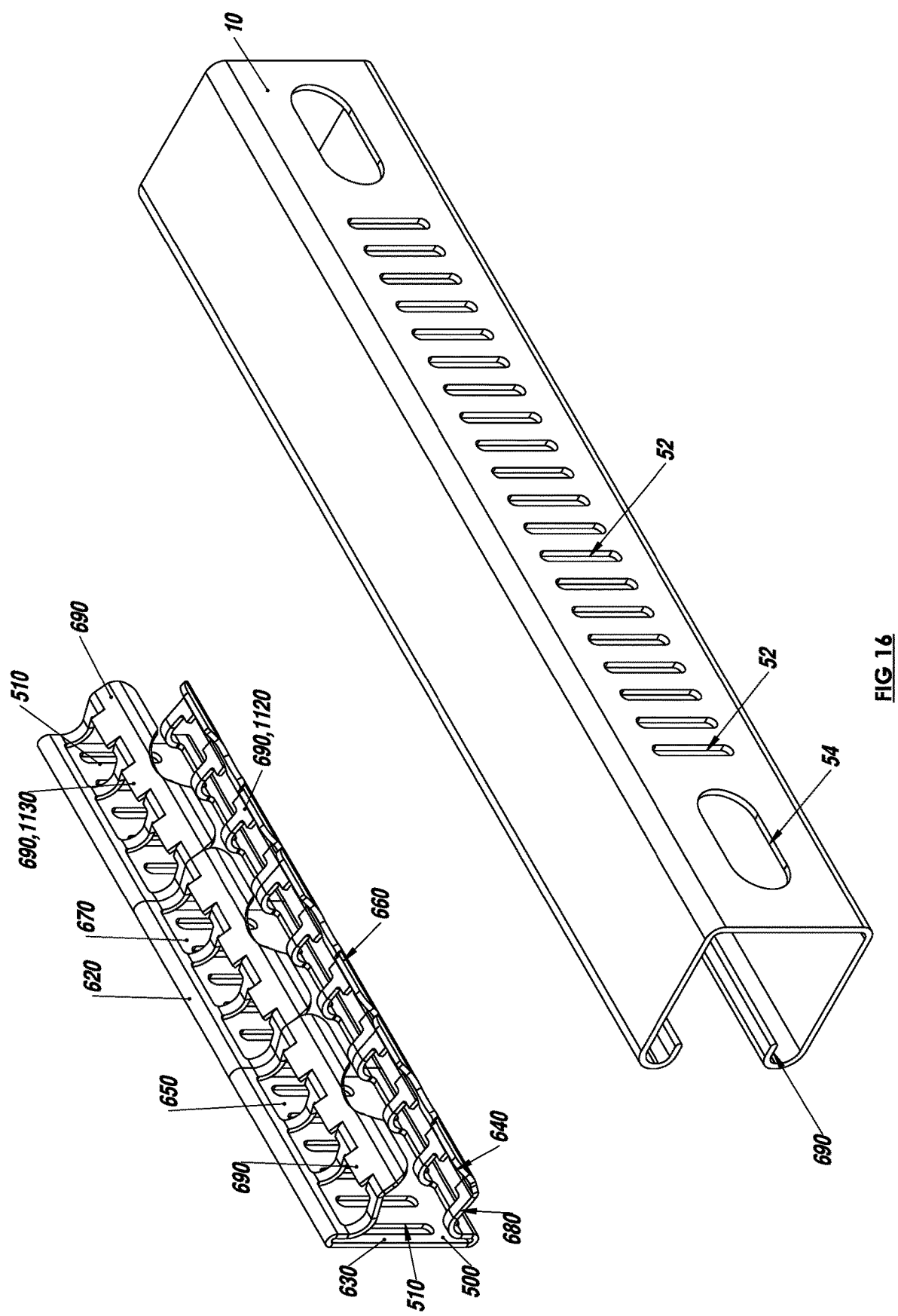
FIG. 16 is an exploded view of a slotted structural member assembly according to an embodiment.

FIGS. 15-16 illustrate the strut receiver 620 and a strut 10. Strut receiver 620 includes a bottom portion 630 having a plurality of slots 510, a first side 640 connected to the bottom portion 630 and a second side 650 connected to the bottom portion 630, thereby forming a U-shaped structure with the first 640 and second sides 650. The sides 640, 650 have optional corresponding plurality of first engagement springs each have an outward facing wings.

Figure 17:
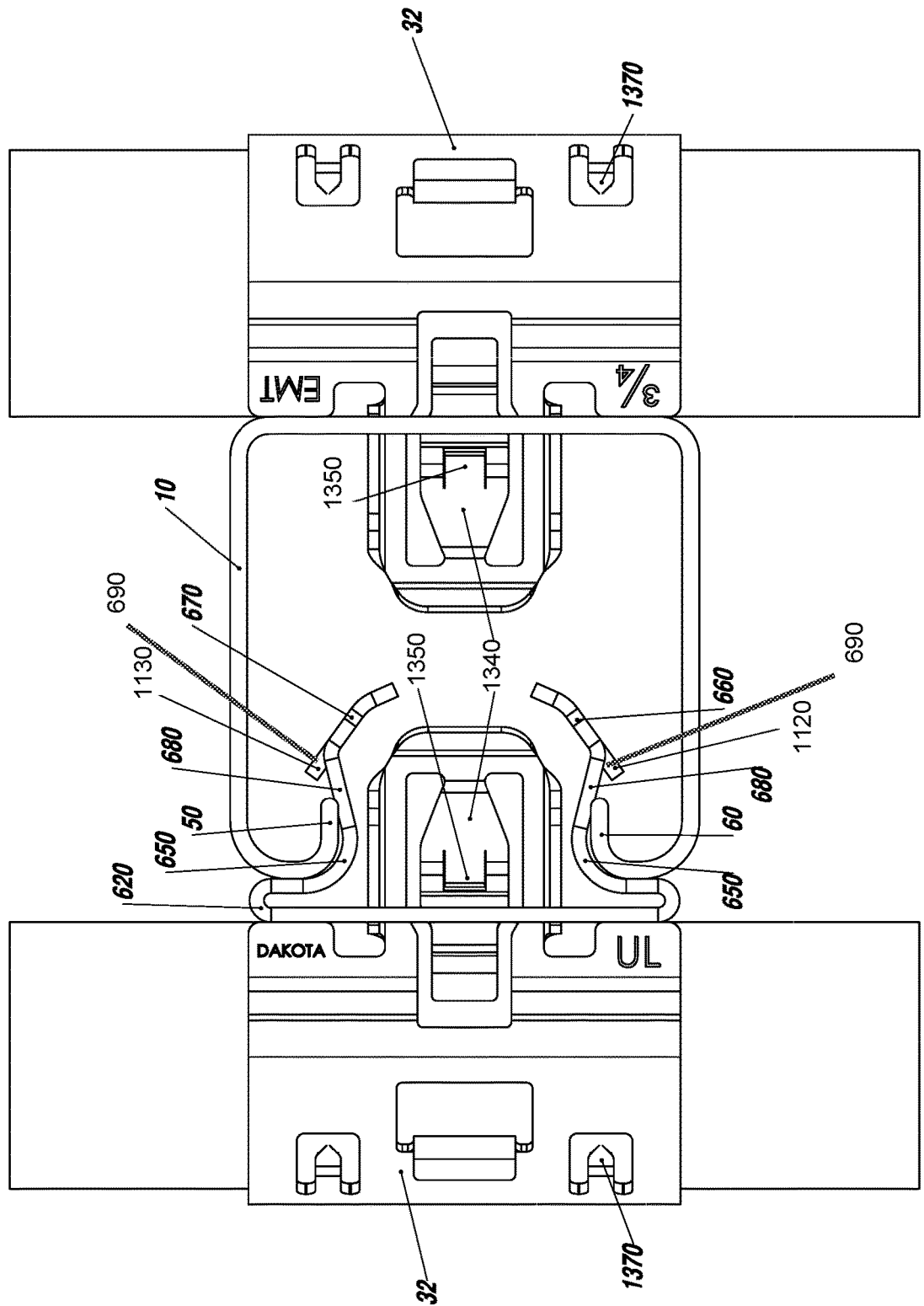
FIG. 17 is an open side view of a slotted structural member, receiver and cage assembly according to an embodiment.

FIG. 16 shows a strut receiver 620 according to another embodiment. As shown in FIG. 17 the wings include sheer tabs 690 to snap into a rim 50, 60 and wherein the arms 680 engage a rim 50, 60 edge when in an engage position. The rim 50, 60 has a curled lip at an end opposite the bottom portion 630.

Outward facing wings 660 on the first side 640 are operable for springing attachment to a first rim 50 on the slotted structural member 10. The outward facing wing 670 on the second side 650 are operable for springing attachment to a second rim 60 on the slotted structural member 10. In other words, the wings 660, 670 are operable for springing attachment to rim 50, 60 of the inside channel walls 1100, 1110 of the slotted structural member 10. As shown in FIG. 17 the height of the arms and wings 660, 670 are chosen according to the wall height of the strut 10 so wings 660, 670 have enough clearance when opposing bands or cages 32 are snapped in. For example, a cage or band 32 is snapped into a receiver 620, the receiver 620 is snapped into a strut 10 and another cage or band 32 is snapped into the strut 10. Thus the height of the strut 10 sets a maximum height of the cage or band 32 and wings 670. Thus if the height of the wall is further reduced then the height of the wings 670 may be reduced accordingly.

According to one embodiment, the wings 660, 670 further comprise a hook 690, 1120,1130 at an open end of the wing 660, 670 extending into an inside rim or lip 50, 60 on the structural member 10. For example, upon insertion the hook 690, 1120,1130 snaps over and partially around the rim 50, 60 in order to hook and thus impede removal of the receiver 620 from the slotted structural member 10. A removal tool such as a screwdriver may be used to pry or bend hooks 690, 1120,1130 away from lips 50, 60 or towards each other to facilitate removal.

According to one embodiment, first side engagement region 660 includes a depression and the second side engagement region 670 is a depression not shown but is described in U.S. Pat. No. 7,188,392 hereby incorporated by reference.

Figure 20:
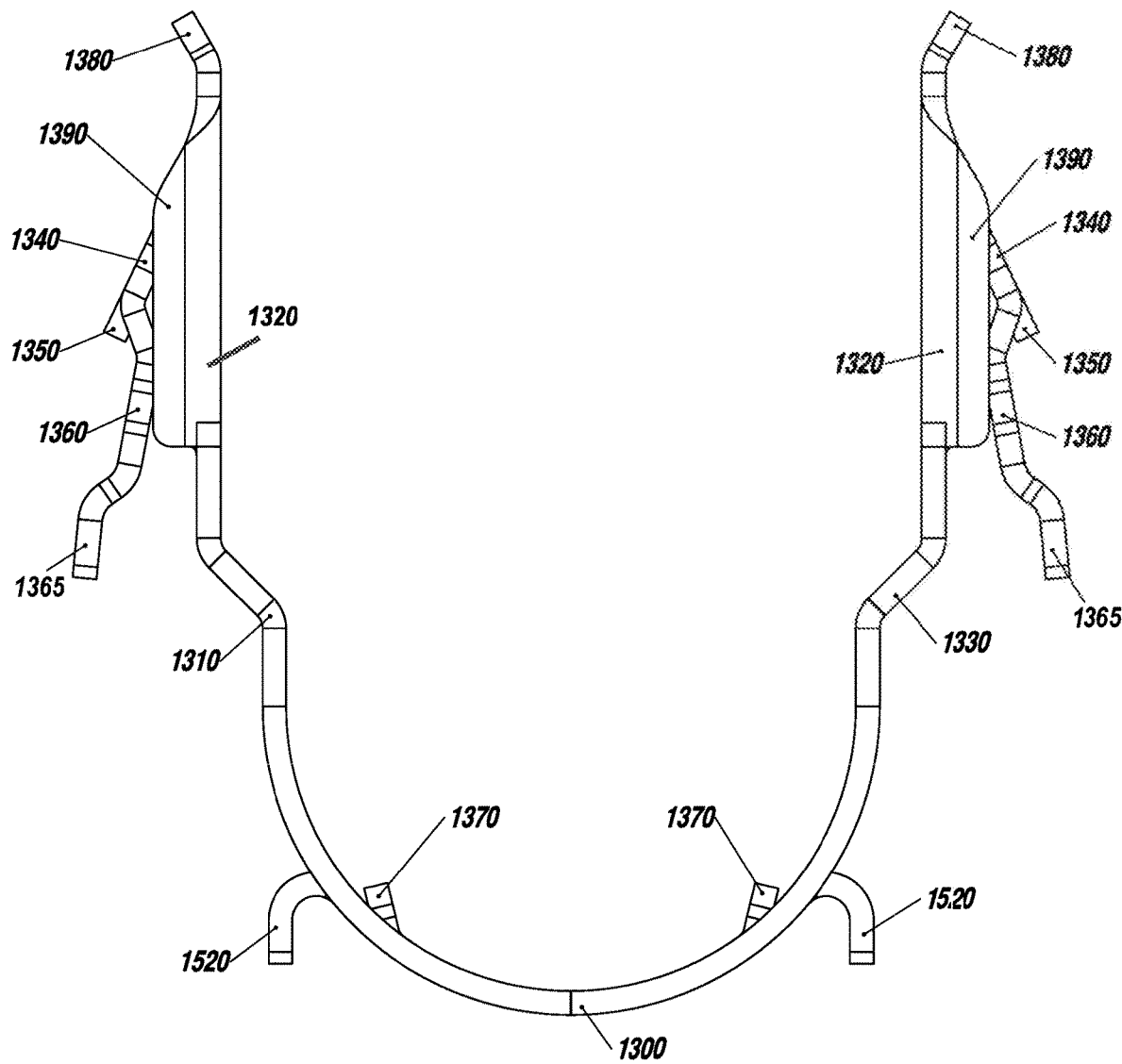
FIG. 20 is an end side view of a cage according to an embodiment.
Figure 21:
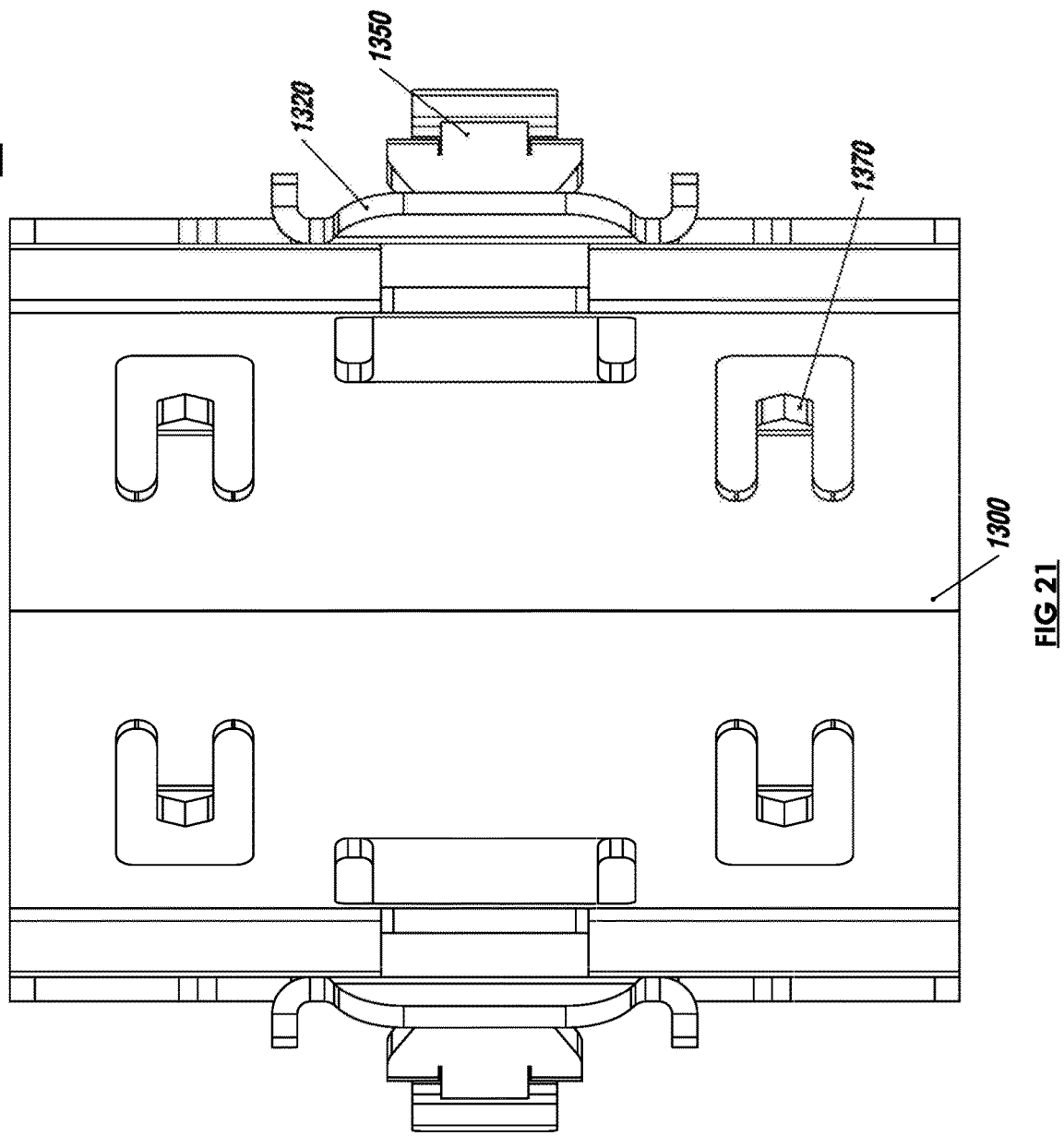
FIG. 21 is a top view of a cage according to another embodiment.

FIGS. 12, 13, 17-21 illustrate a band 32. FIG. 20 shows a band 32 having a bottom portion 1300 a first side 1310 having a first arm 1320 for engaging a first receiver slot 510 and a second side 1330 having a second arm 1320', for optionally engaging a second receiver slot 510'. The arms 1320, 1320' form a u-shape such that from the horizontal portion of the U-shaped portion extends the arms 1320, 1320'. Wing 1340, extending from the arms 1320. The bottom portion 1300 has a shape selected from at least one of: a semicircular, oval, or conic, or any suitable shape.

The first arm 1320 further comprises at least one first engagement region and the second arm 1320' further comprises at least one second engagement region.

The wings 1340 further comprise a servicing tab 1365 on each wing for removably retaining the band into the first and second slots. The wings 1340 on the at least one arm 1320, 1320' to snap into the slot 510. The wings 1340 engage the strut or receiver slots 510 with a knuckle 1350 at an open end of the wing 1340 extending into an inside lip on the structural member. The knuckle 1350 pushes the wing 1340 inward during insertion into the slot 510. According to one embodiment, the knuckle 1350 further comprises a depression on each knuckle 1350 to "catch" an edge of slot 510 thus providing for low insertion force and a relatively high extraction force when engaging the receiver slots 510. As the knuckle 1350 pinnacle passes through the slot 510, the knuckle 1350 snaps out until the cradle 1360 portion of the wing 1340 rests on the inside of slot 510 during an engaged position.

According to one embodiment, the wing 1340 has a tapered width to allow the wing 1340 to return when snapped into the slot 510. The width may be selected such that sufficient metal or material provides sufficient springing constant or return force when snapped into slot 510.

The band bottom 1300 portion further comprises a plurality of tensioner prongs or "barbs" 1370 to engage a conduit or pipe 40 when the band 32 is in an engaged position with the receiver 20. Barbs 1370 will touch a surface of the conduit 40 during engagement such that the barbs 1370 will flex, and maintain pressure to prevent conduit 40 from sliding back and forth. Also barbs 1370 take up tolerance between the band 32 and the conduit 40, so there may be a suitable resulting gap between conduit 40 and the band 32. Thus a design choice for a range of different diameter conduit 40 could fit within a band 32. Different shapes of pipe, such as square, oval, triangular or any suitable shape of pipe 40 are contemplated. As the band 32 is inserted during engagement, pipe 40 is pushed and depending on the relative diameter will cause square band 32 to bend according to the conduit outer surface, for example into a rounded shape and in combination bends with the springing action of barbs 1370, takes a set. For example, bending may occur beyond yield point on the modulus of elasticity of the metal in band 32 and changes the shape and the spring rate. The mentioned factors may be selected or designed so the pipe 40 does not become loose. According to one embodiment, the prongs 1370 accommodate different pipe sizes such as pipe 40. For example, the curved and/or sharp point 1370 digs into pipe 40 body.

Each arm 1320, 1340 on the band has a tapered tip 1380 at the end of wing 1340. Each arm 1320, 1340, on the band 32 has a curved tip 1380 at the end of the wing 1340. Curved tip 1380 is sufficiently curved so that as inserted the wings 1340 open as necessary and ease insertion. During heat treatment, the curved portion may shrink causing the diameter to decrease and thus the curved tips' tapered tip 1380 allow easy insertion of the tips tapered tip 1380 into the slots.

FIGS. 17-21 also illustrate a flange 1390 on band 32. Due to the bend in flange 1390 to form a sort of tapered corner, the bent flange 1390 fills slot 52, 510, 510' hole, such as the width of the hole, where the width is just below width of slot 52, 510, 510'. The flange 1390 prevents rocking and rotation of the band 32.

Tapered tip 1380 functions as a lead in and allows the wing 1340, 1840 to locate the band 30 in the slot 510. Tapered tip 1380, 168 makes insertion into the slot 510 easier, than during insertion, the edge of the wing 1820 engages the slot 510, and snaps over the slot 510.

Figure 18:
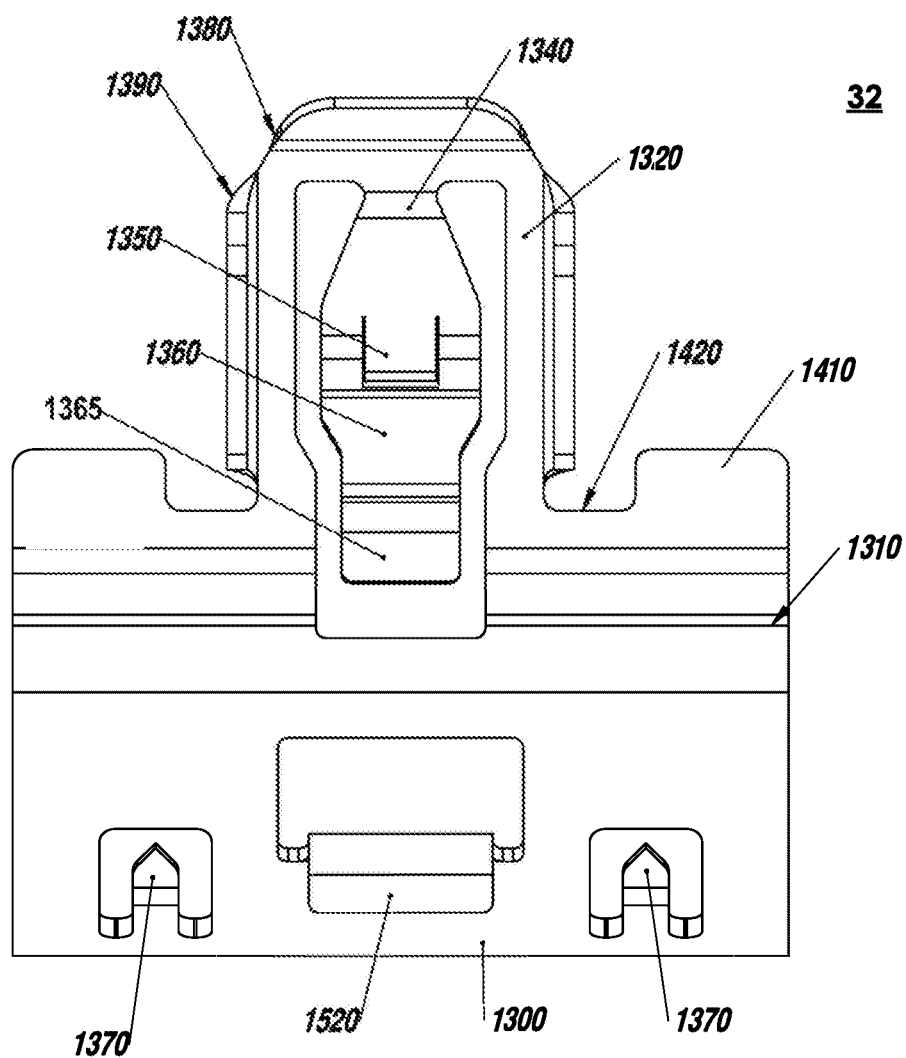
FIG. 18 is a side view of a cage according to an embodiment.
Figure 19:
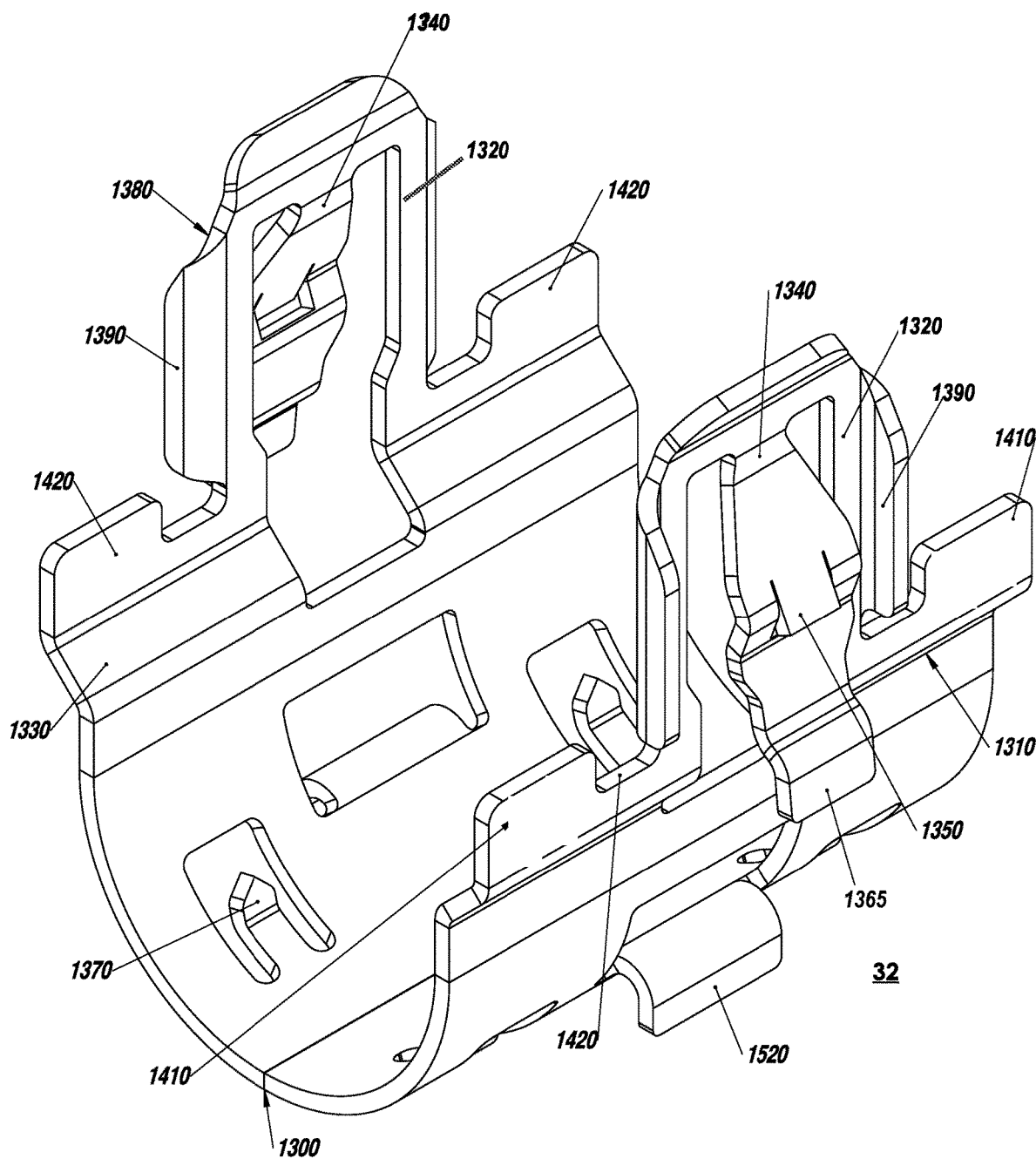
FIG. 19 is a perspective view of a cage according to an embodiment.

FIG. 18 illustrates on each arm 1320 on the band 32 has an optional shoulder stop 1410. Shoulder stop 1410 creates a hard stop during insertion. Gap 1420 between flanges 1390 and shoulder 1410 is material or the lack of material needed to suitably bend to form angle in flange 1390. Wall shoulder 1410 is thus vertical to make shoulder 1410 strong. Within the receiver 20 in between slots 52, 510, 510' holding wing knuckle tab 1350 needs to be strong and thick enough to hold clip band 32.

The band 32 may further include at least one insertion driver prong, tab 1520 on the bottom portion 1300 to assist in snapping the at least one arm 1320 into the slot 52, 510. Insertion may be by a palm push. Alternatively a screw driver pushed down on insertion tab 1520 creates a force down the arm 1320, 1340 so screw driver pushes down, on each side one at a time, to cause wing 1340 to snap and engage. Pushing with ones palm may cause wings 1340 to go off center. Pushing with screw driver directs force downwards, with ergonomic handle.

Figure 10:
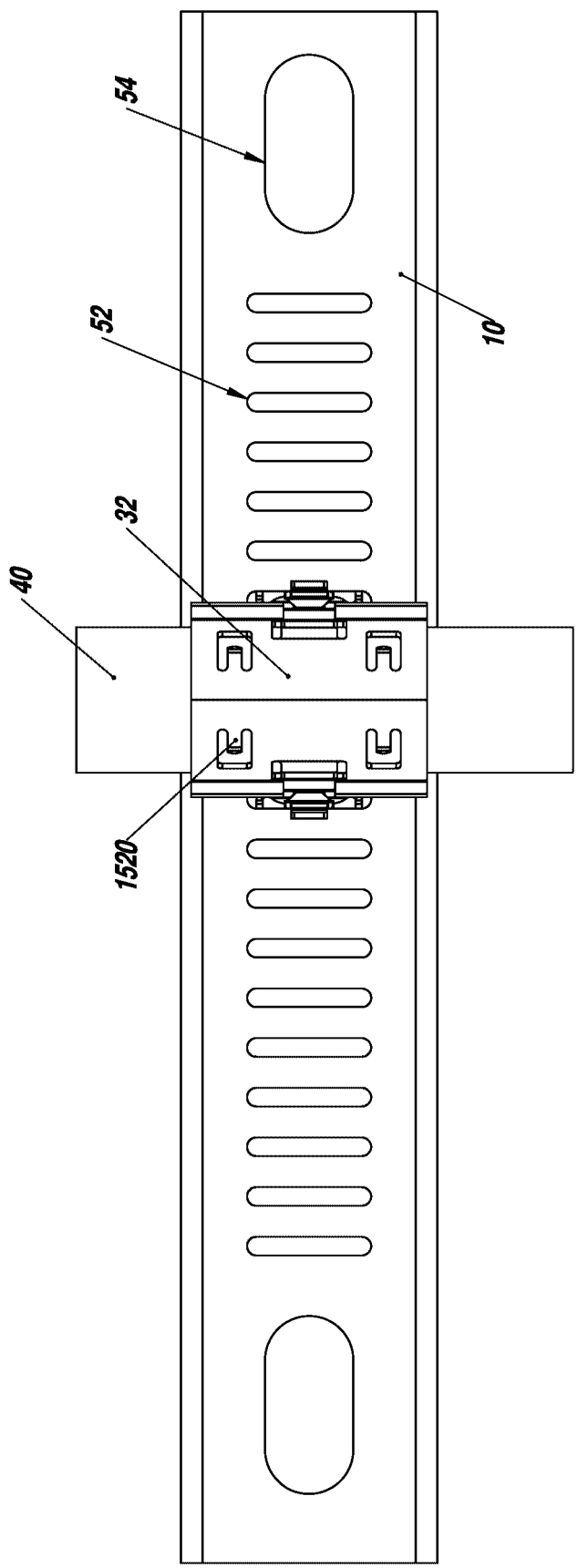
FIG. 10 is a top view of a slotted structural member according to another embodiment.
Figure 11:
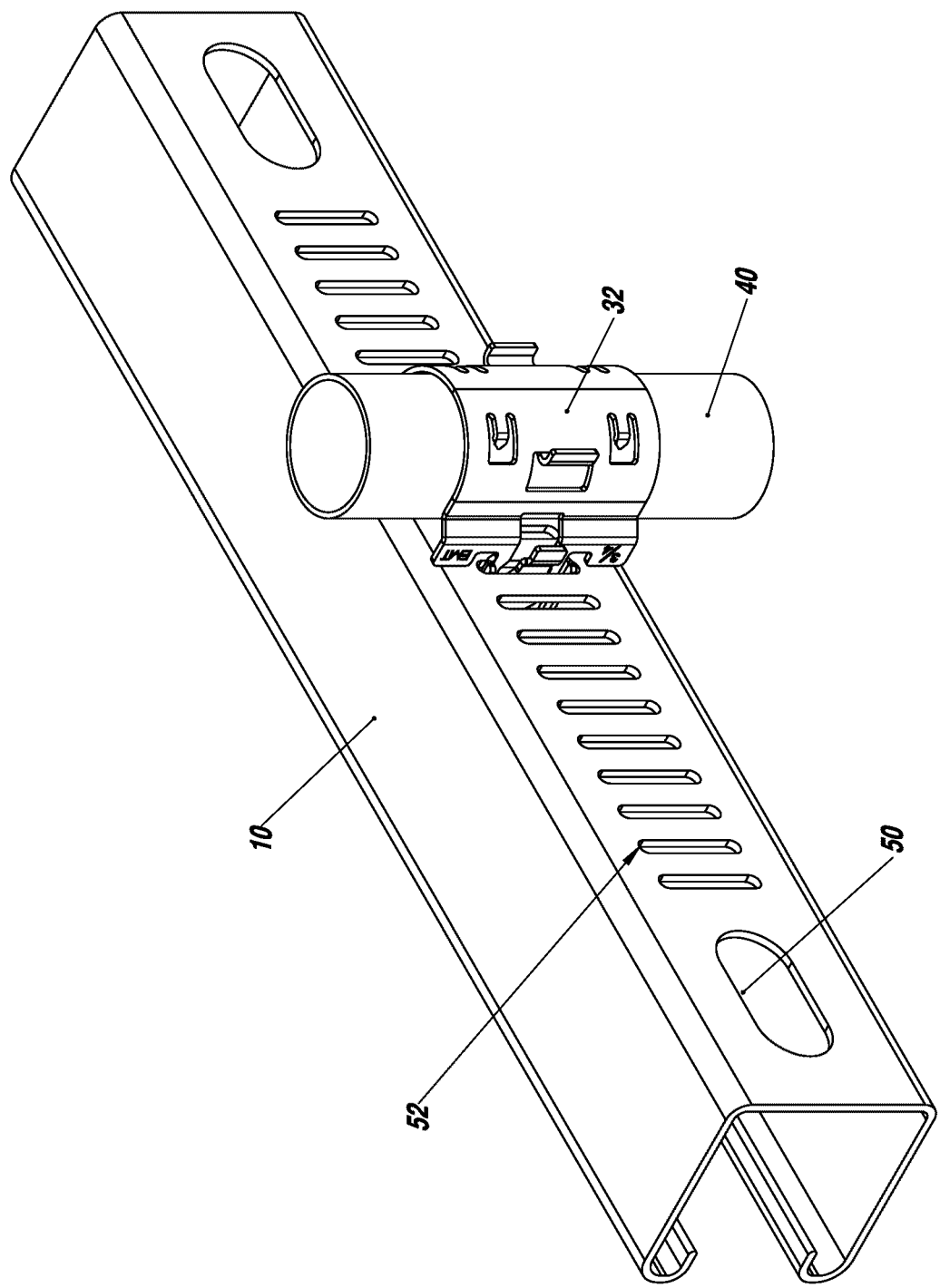
FIG. 11 is a perspective view of a slotted structural member in an engaged position with a band according to one embodiment.
Figure 12:
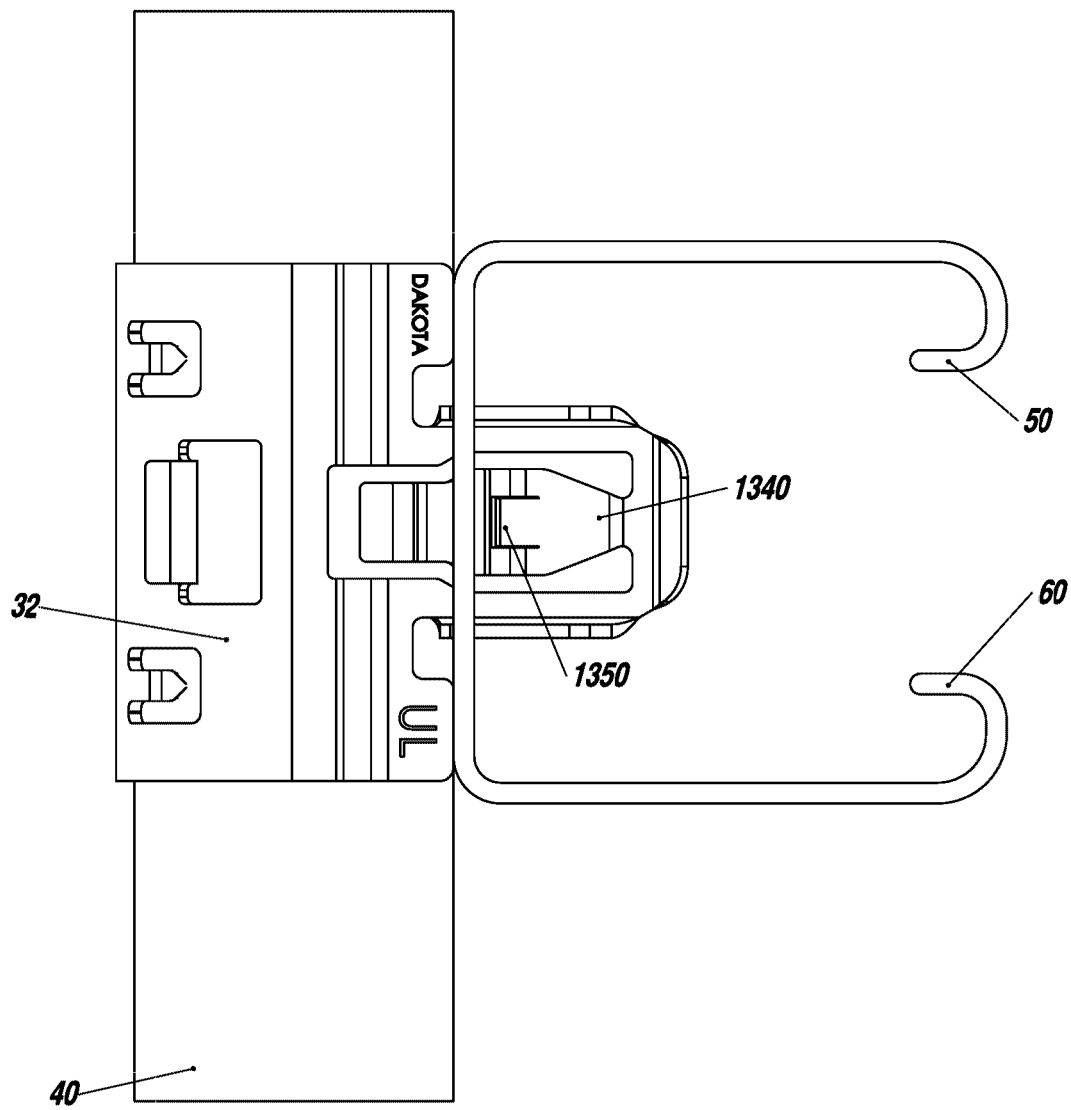
FIG. 12 is an open end view of a slotted structural member in an engaged position with a band according to another embodiment.
Figure 13:
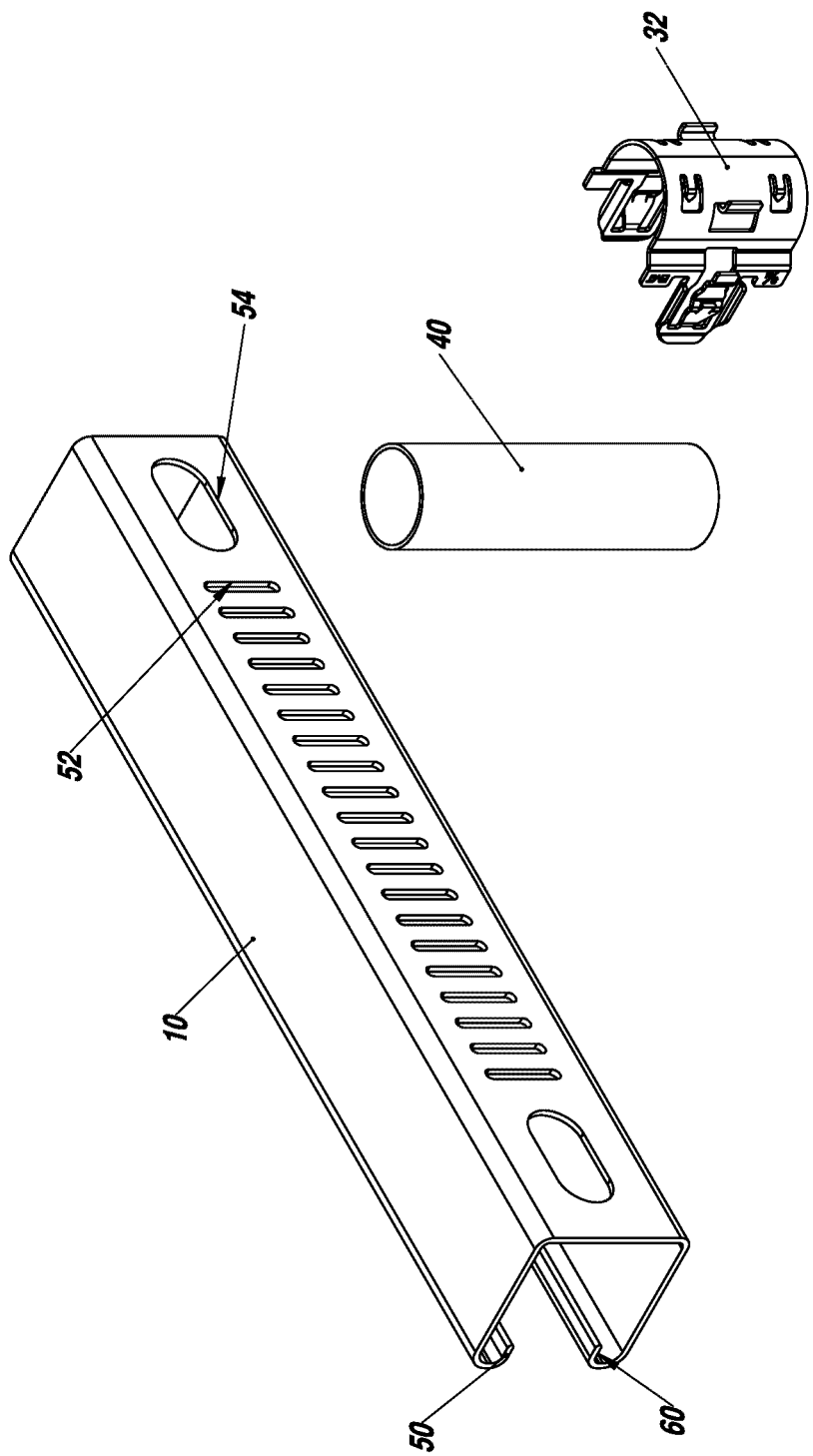
FIG. 13 is an exploded view of a slotted structural member, cage and conduit according to one embodiment.
Figure 14:
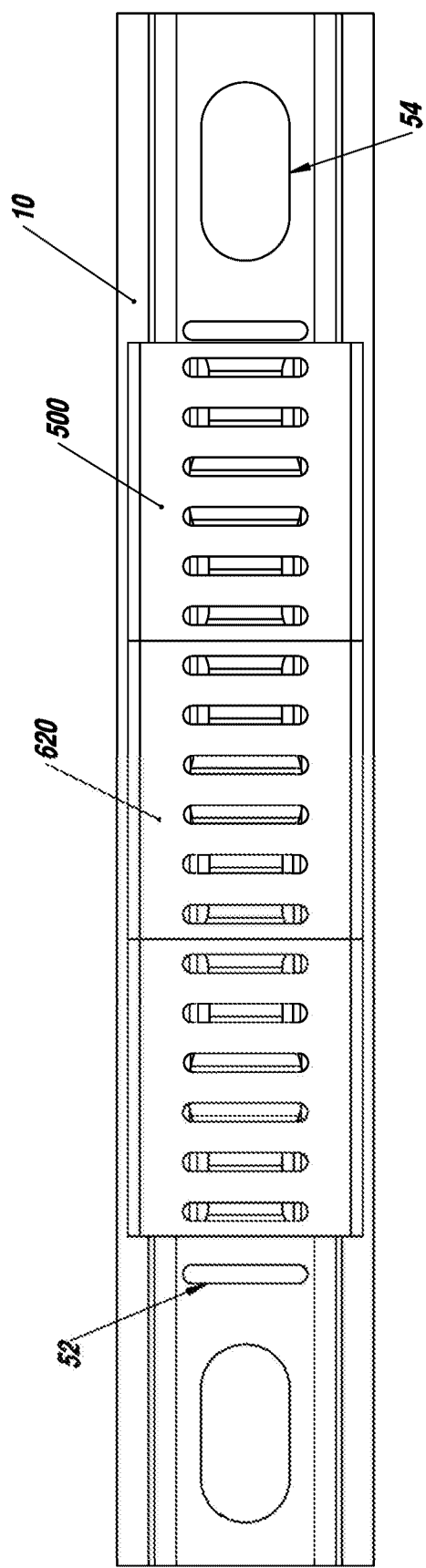
FIG. 14 is a top view of multiple strut receivers in an engaged position with a strut member according to another embodiment.

FIGS. 10, 11 illustrate one embodiment of the band 32 according to another embodiment. FIGS. 11, 12 are perspective views of a band 32 in an engaged position with the strut member operable to attach to a pipe 40 according to another embodiment. During the engaged position, the knuckle 1350 on band 32 hooks an upper surface and an edge of slot 510 to provide a high level of extraction force to restrict wing 1340 from withdrawing from slot 510.

Figure 2:
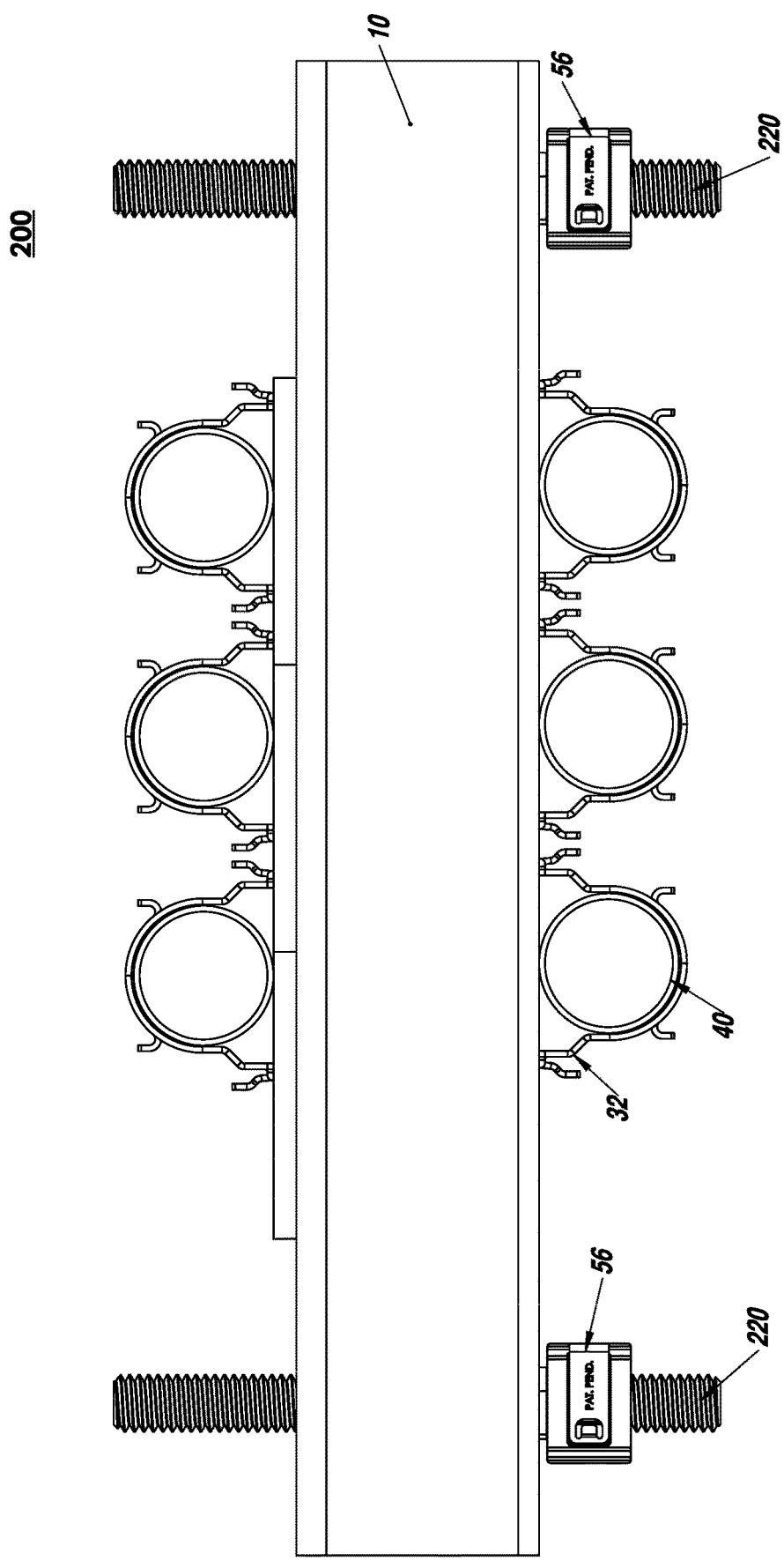
FIG. 2 is a view of a slotted structural member assembly with multiple cages and a strut member according to another embodiment.
Figure 3:
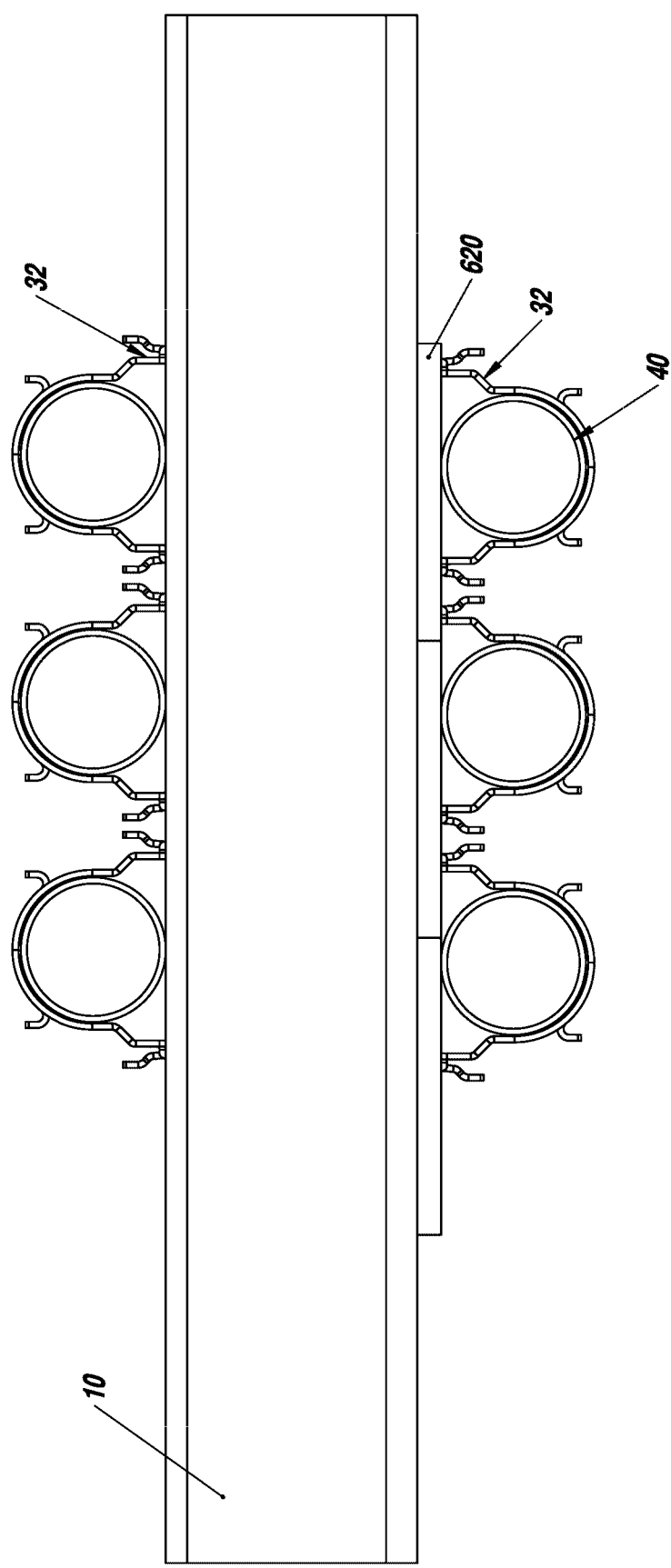
FIG. 3 is a side view of a slotted structural member assembly with multiple cages and a strut member according to one embodiment.
Figure 4:
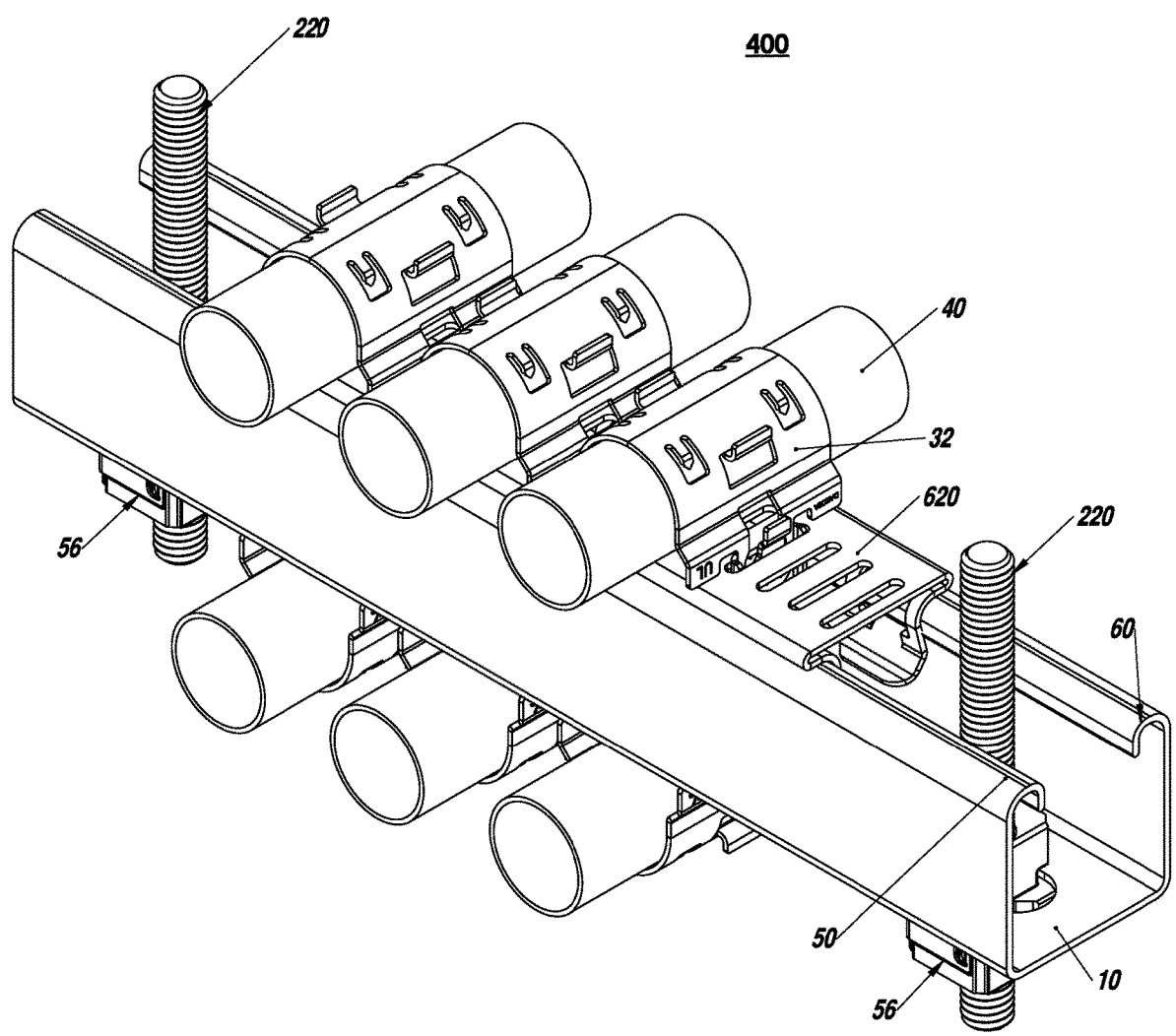
FIG. 4 is a perspective view of a slotted structural member with multiple cages and a strut member assembly according to one embodiment.
Figure 5:
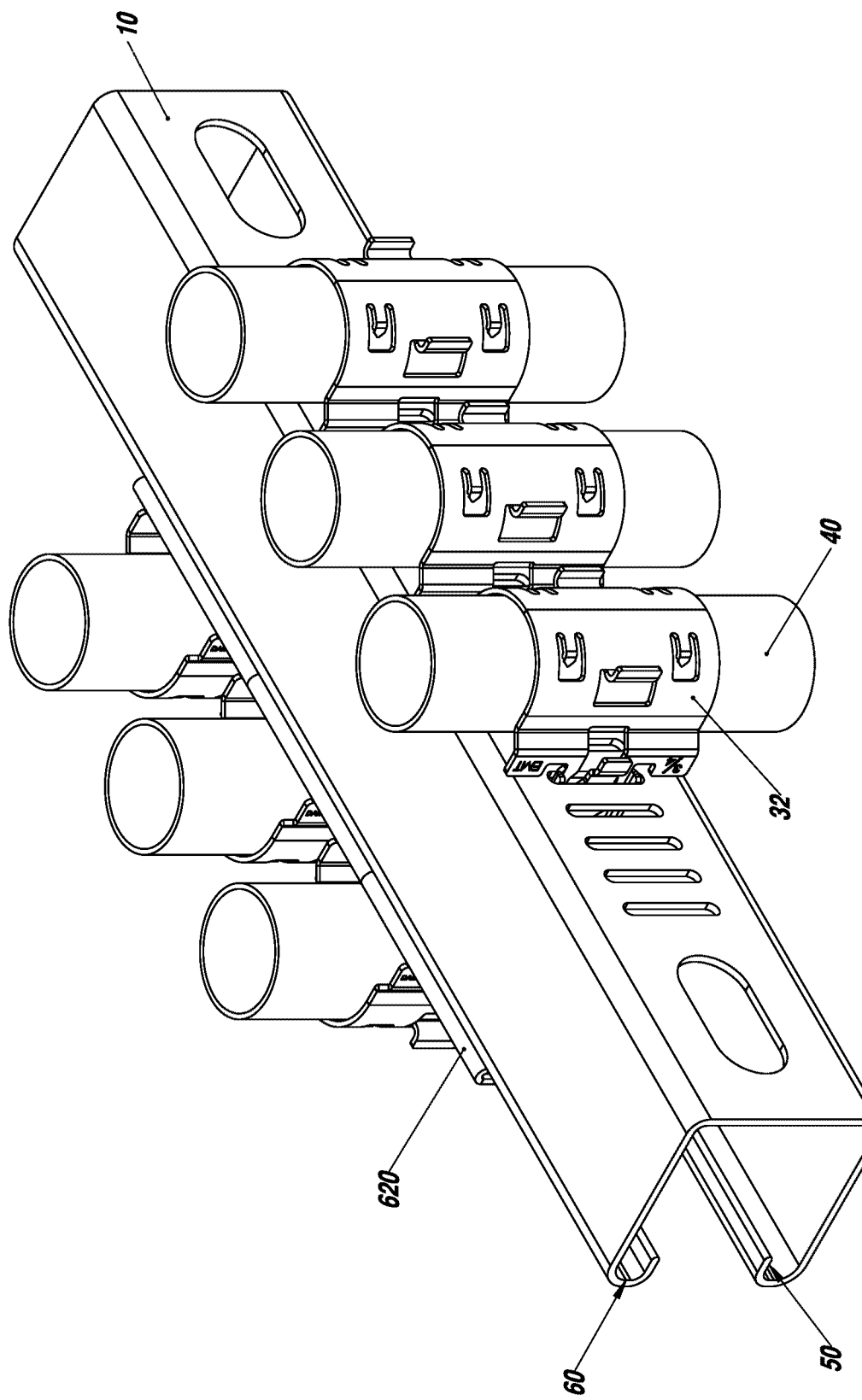
FIG. 5 is another perspective view of a slotted structural member assembly with multiple cages and a strut member according to one embodiment.
Figure 6:
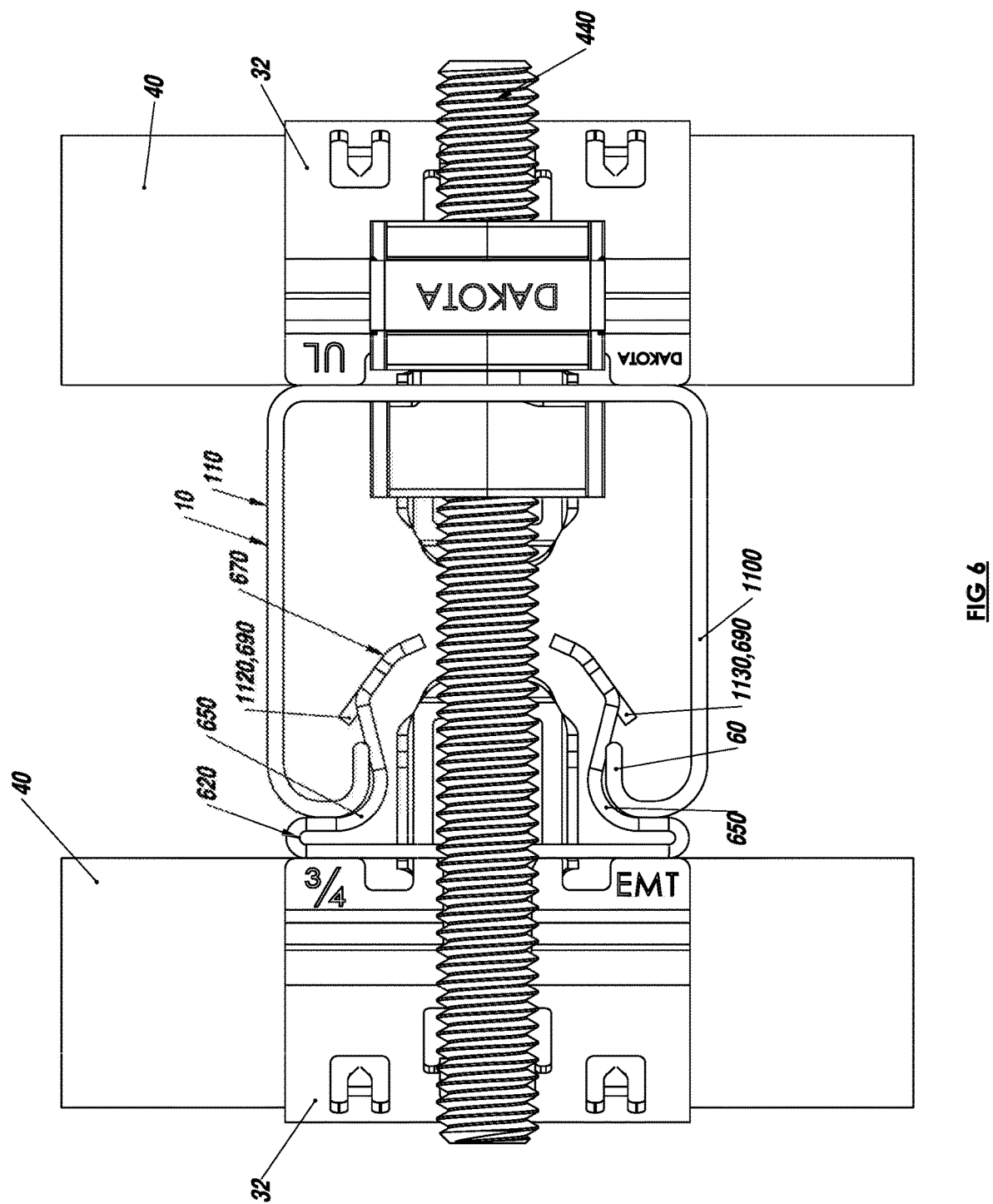
FIG. 6 is an open end view of a slotted structural member assembly according to another embodiment.
Figure 7:
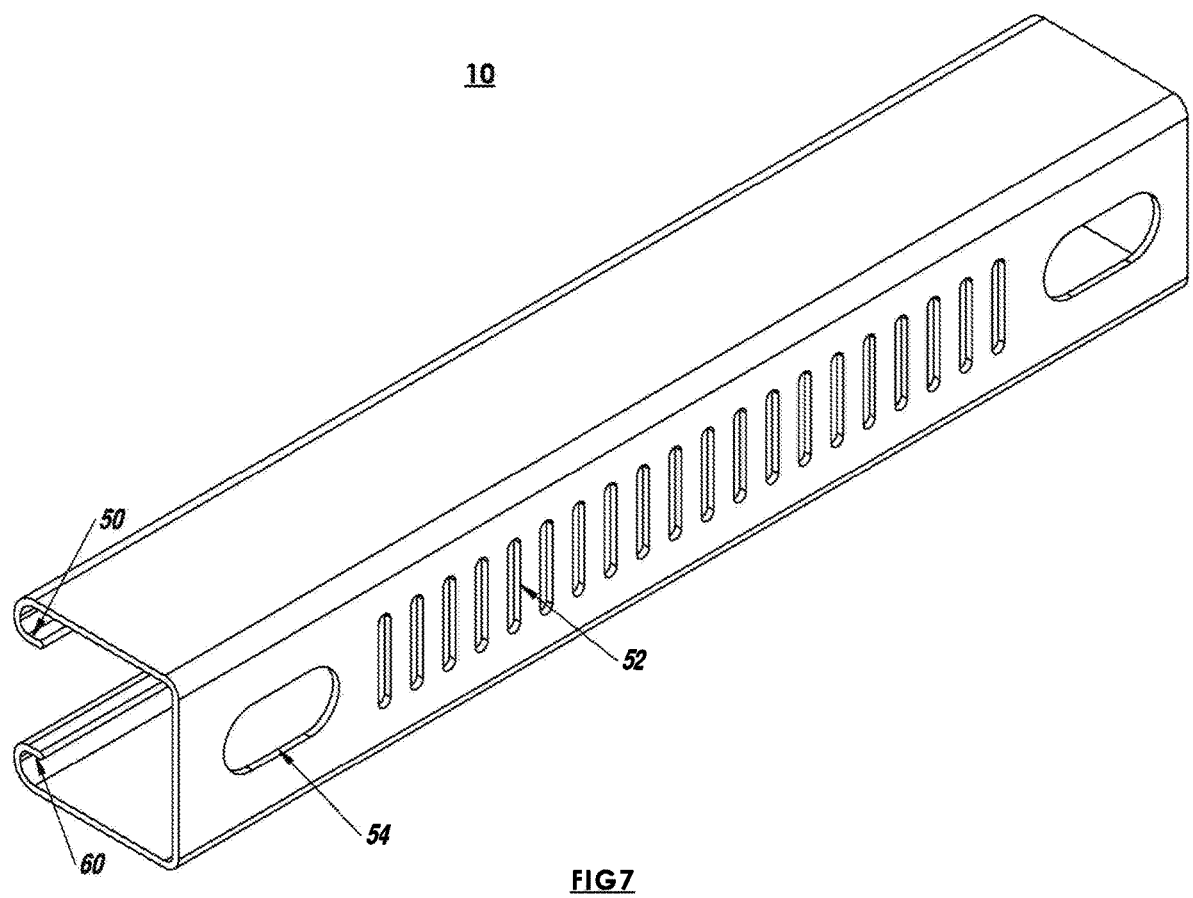
FIG. 7 is a perspective view of a slotted structural member according to another embodiment.
Figure 8:
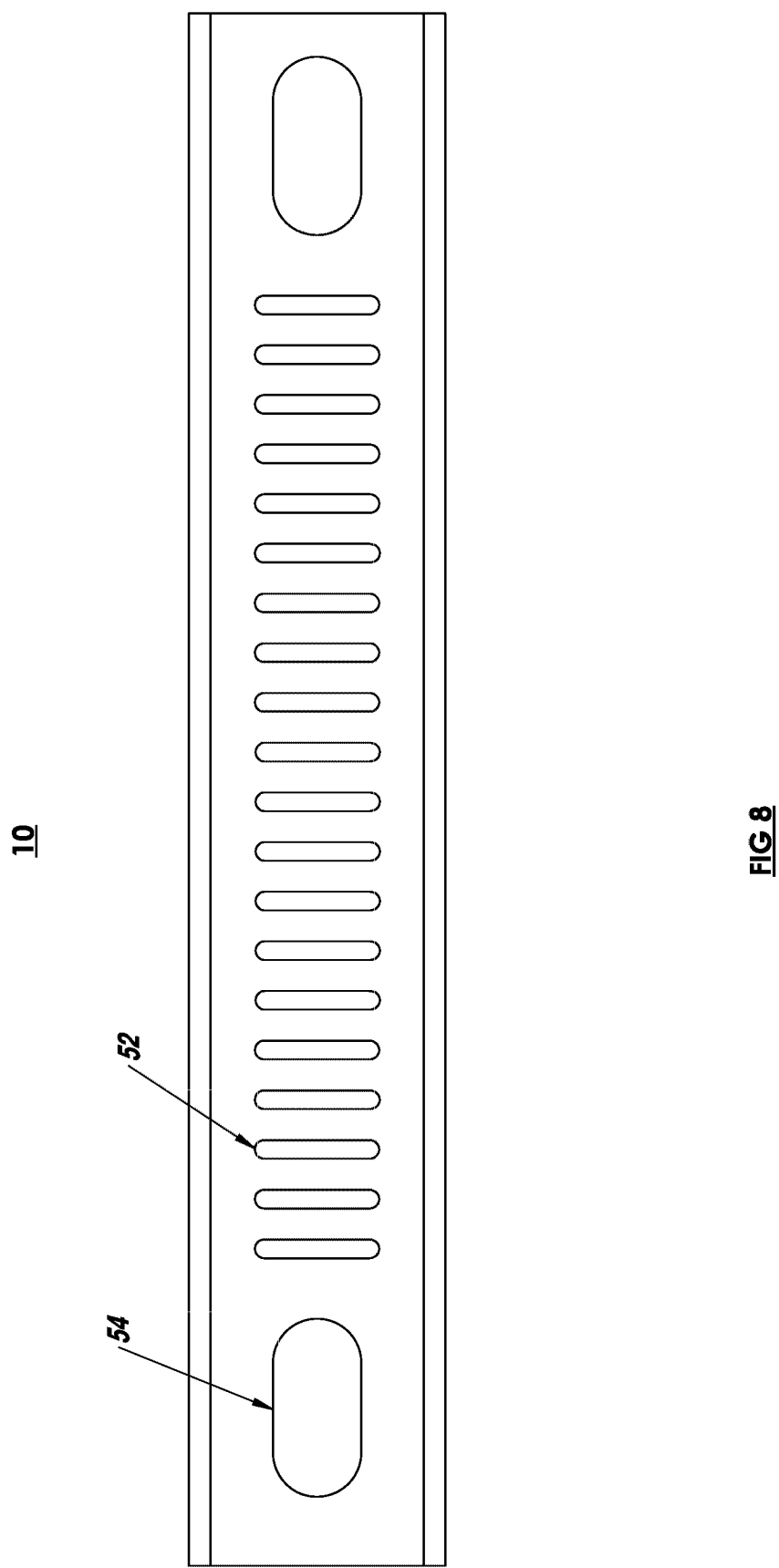
FIG. 8 is a top view of a slotted structural member according to another embodiment.
Figure 9:
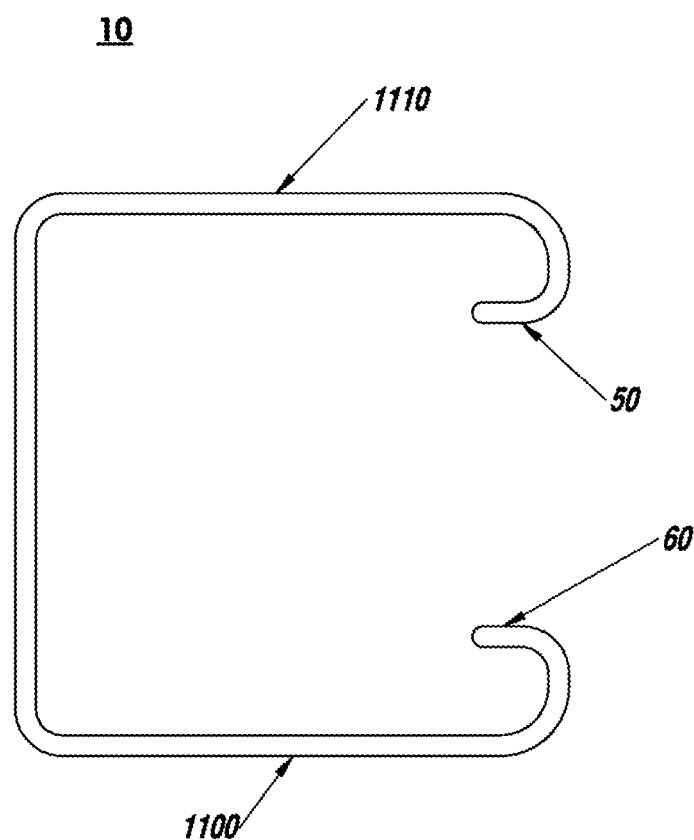
FIG. 9 is an open end view of a slotted structural member according to another embodiment.

As shown in FIGS. 2 and 4 a threaded fastener 220 may be a hanger commonly used in construction and for attachment through hole 54 and secured via nuts 56 to struts 10.

Figure 22:
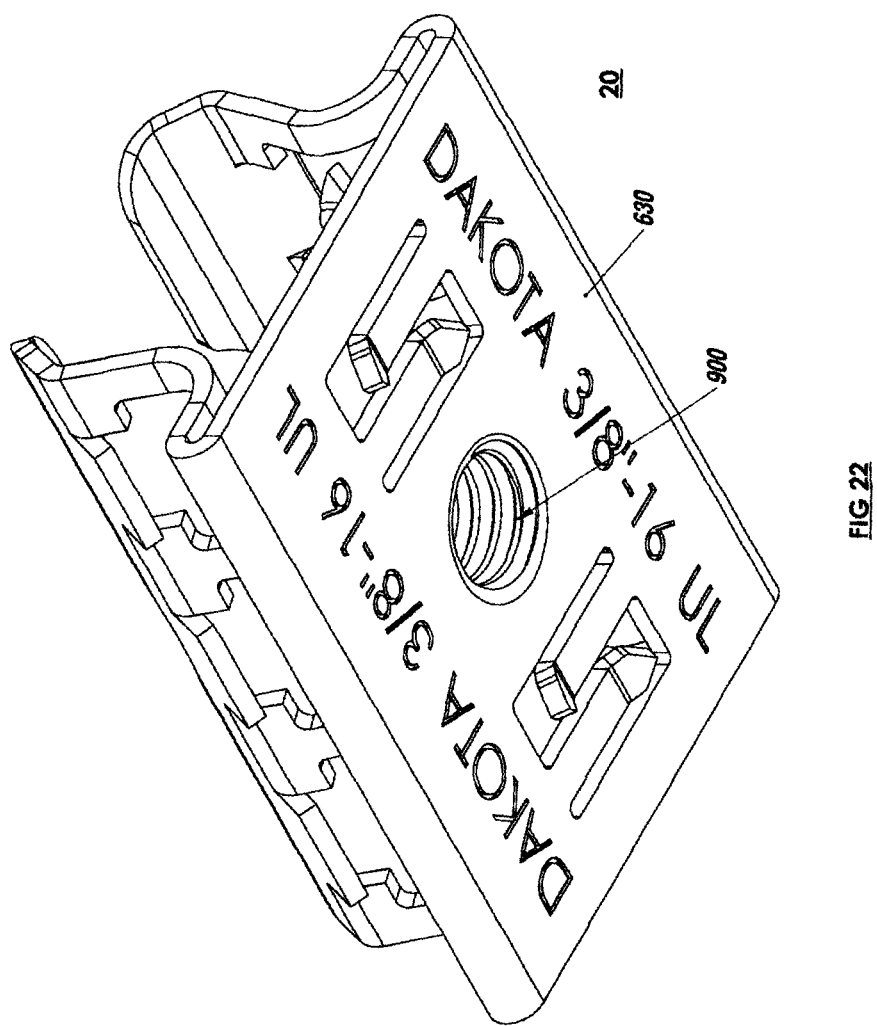

FIG. 22-23 illustrate one embodiment wherein the bottom portion 630 has threads 900 operable for receiving a threaded fastener 220 such as a screw or rod or any suitable threaded cylinder, not shown. The threads 900 may be drilled, cut or a nut may be welded, cast, forged, or attached to the bottom portion 630 using any suitable attachment means.

It is understood that the implementation of other variations and modifications of the present invention in its various aspects will be apparent to those of ordinary skill in the art and that the invention is not limited by the specific embodiments described. It is therefore contemplated to cover by the present invention any and all modifications, variations or equivalents that fall within the spirit and scope of the basic underlying principles disclosed and claimed herein.

What is claimed is:

1. A U-shaped band to attach a pipe to a slotted structural member comprising:
    a bottom portion,
    a first side having a first arm connected to the bottom portion;
    a second side having a second arm connected to the bottom portion thereby forming a U-shaped structure with the first and second sides; and
    wherein at least one arm includes a wing to snap into a slot of a plurality of slots on a bottom side of the slotted structural member when in an engaged position.

2. A U-shaped band as in claim 1, wherein the wing on the at least one arm further comprises at least one engagement region to engage a slot in the slotted structural member.

3. A U-shaped band as in claim 1, wherein the wing on the at least one arm of the U-shaped band includes a knuckle having a depression to catch an edge of the slotted structural member.

4. A U-shaped band as in claim 3, wherein the wing has a tapered width to allow the wing to return when snapped into the slot.

5. A U-shaped band as in claim 1, wherein the wing further comprises a knuckle at an open end of the wing extending into an inside lip on the slot of the slotted structural member.

6. A U-shaped band as in claim 1, wherein the bottom portion has a shape selected from at least one of: a semicircular, oval, or conic.

7. A U-shaped band as in claim 1, further including a stabilizer flange on the at least one arm to engage the slot.

8. A U-shaped band as in claim 1, further including a driver prong on the bottom portion to assist in snapping the at least one arm into the slot.

9. A slotted structural member assembly comprising:
    a strut;
        a bottom portion having a plurality of strut slots;
        a first side connected to the bottom portion;
        a second side connected to the bottom portion, thereby forming a U-shaped structure with the first and second sides;
    a band comprising:
        a band bottom portion,
        a first side having a first arm connected to the band bottom portion;
        a second side having a second arm connected to the band bottom portion;
    wherein at least one arm snaps into a strut slot of the strut when in an engaged position.

10. A slotted structural member assembly of claim 9 comprising:
    a strut receiver having at least one receiver slot; and
    a second band is operable to snap into the receiver slot.

11. A slotted structural member assembly as in claim 9, wherein:
    the first arm snaps into a first strut slot; and
    the second arm snaps into a second strut slot.

12. A strut receiver assembly for springing attachment to a slotted structural member comprising:
    a strut receiver;
        a bottom portion having a plurality of receiver slots;
        a first side connected to the bottom portion;
        a second side connected to the bottom portion, thereby forming a U-shaped structure with the first and second sides;
        a plurality of first engagement springs each having an outward facing wing on the first side operable for springing attachment to a first rim on the slotted structural member;
        a plurality of second engagement springs each having an outward facing wing on the second side operable for springing attachment to a second rim on the slotted structural member;
    a band comprising:
        a band bottom portion,
        a first side having a first arm connected to the band bottom portion;
        a second side having a second arm connected to the band bottom portion;
    wherein at least one arm snaps into a receiver slot when in an engaged position.

13. A strut receiver assembly as in claim 12, wherein:
    the first arm snaps into a first receiver slot; and
    the second arm snaps into a second receiver slot.

14. A strut receiver assembly as in claim 12, wherein the wing on the at least one of the first engagement springs further comprises at least one engagement region to engage a slot in the slotted structural member.

15. A strut receiver assembly as in claim 12, further including a wing on the at least one arm to snap into the receiver slot.

16. A strut receiver assembly as in claim 15, wherein the wing further comprise a tab at an open end of the wing extending into a receiver slot rim.

17. A strut receiver assembly as in claim 15, wherein the wing has a tapered width to allow the wing to return when snapped into the receiver slot.

18. A strut receiver assembly as in claim 12, wherein the band bottom portion has a shape from at least one of: a semicircular, oval, or conic.

19. A strut receiver assembly as in claim 12, wherein the band bottom portion further comprises at least one tensioner prong to engage a conduit when the band is in an engaged position with the receiver.

* * * * *